(12) United States Patent
Ji et al.

(10) Patent No.: US 11,290,976 B2
(45) Date of Patent: Mar. 29, 2022

(54) APPARATUS AND METHOD FOR ESTIMATING INDOOR LOCATION BASED ON PACKET CAPTURE

(71) Applicant: ELECTRONICS AND TELECOMMUNICATIONS RESEARCH INSTITUTE, Daejeon (KR)

(72) Inventors: Myung-In Ji, Daejeon (KR); Young-Su Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 32 days.

(21) Appl. No.: 16/853,557

(22) Filed: Apr. 20, 2020

(65) Prior Publication Data

US 2020/0367192 A1 Nov. 19, 2020

(30) Foreign Application Priority Data

May 16, 2019 (KR) .................. 10-2019-0057586

(51) Int. Cl.
*H04W 64/00* (2009.01)
*H04W 4/029* (2018.01)
*H04W 4/33* (2018.01)
*H04W 88/08* (2009.01)
*H04L 12/26* (2006.01)
*H04W 4/02* (2018.01)
*H04L 43/12* (2022.01)
*H04L 43/028* (2022.01)

(52) U.S. Cl.
CPC ......... *H04W 64/003* (2013.01); *H04L 43/028* (2013.01); *H04L 43/12* (2013.01); *H04W 4/023* (2013.01); *H04W 4/029* (2018.02); *H04W 4/33* (2018.02); *H04W 88/08* (2013.01)

(58) Field of Classification Search
CPC ..... H04W 64/003; H04W 4/33; H04W 4/029; H04W 4/023; H04W 88/08; H04L 43/028; H04L 43/12
See application file for complete search history.

(56) References Cited

U.S. PATENT DOCUMENTS

| 9,078,231 | B2 | 7/2015 | Cho et al. |
| 10,178,685 | B2 | 1/2019 | Sung et al. |
| 10,674,331 | B1* | 6/2020 | Huang ................. H04W 4/025 |
| 2001/0033600 | A1* | 10/2001 | Yang .................... H01Q 1/246 |
| | | | 375/130 |

(Continued)

FOREIGN PATENT DOCUMENTS

| KR | 101301020 B1 | 8/2013 |
| KR | 101780592 B1 | 9/2017 |
| KR | 101902442 B1 | 9/2018 |

*Primary Examiner* — Dinh Nguyen

(57) ABSTRACT

Disclosed herein are an apparatus and method for estimating an indoor location based on packet capture. The method for operating an apparatus for estimating an indoor location based on packet capture includes receiving packet capture information from multiple packet-collection-dedicated access points, searching a positioning infrastructure database for positioning data corresponding to the received packet capture information, and estimating a movement direction of a terminal using found positioning data.

17 Claims, 10 Drawing Sheets

(56) References Cited

U.S. PATENT DOCUMENTS

| | | | | |
|---|---|---|---|---|
| 2003/0162550 | A1* | 8/2003 | Kuwahara | G01S 5/0205 |
| | | | | 455/456.1 |
| 2005/0185618 | A1* | 8/2005 | Friday | H04B 17/318 |
| | | | | 370/331 |
| 2007/0121560 | A1* | 5/2007 | Edge | H04W 64/00 |
| | | | | 370/338 |
| 2010/0178928 | A1* | 7/2010 | O'Reilly | H04W 28/26 |
| | | | | 455/452.2 |
| 2010/0216488 | A1* | 8/2010 | Markoulidakis | G01S 5/14 |
| | | | | 455/456.1 |
| 2015/0071102 | A1* | 3/2015 | Sadasivam | H04W 4/026 |
| | | | | 370/252 |
| 2017/0185873 | A1* | 6/2017 | Wang | G06K 9/6228 |

* cited by examiner

| PACKET-COLLECTION-<br>DEDICATED AP<br>COLLECTION POINT | AP1 | AP2 | AP3 | ... | APK |
|---|---|---|---|---|---|
| (X1,Y2,F1) | −60dBm | N/A | −70 | ... | −80 |
| (X1,Y2,F3) | −65 | −42 | N/A | ... | −50 |
| (X1,Y2,F3) | ... | ... | ... | ... | ... |
| ... | | | | | |
| (XN,YN,FN) | | | | | |

FIG. 3

APPARATUS AND METHOD FOR ESTIMATING INDOOR LOCATION BASED ON PACKET CAPTURE

CROSS REFERENCE TO RELATED APPLICATION

This application claims the benefit of Korean Patent Application No. 10-2019-0057586, filed May 16, 2019, which is hereby incorporated by reference in its entirety into this application.

BACKGROUND OF THE INVENTION

1. Technical Field

The present invention relates to an apparatus and method for estimating an indoor location based on packet capture.

2. Description of the Related Art

Generally, location estimation technology using wireless communication infrastructure may exist as various schemes depending on the type of infrastructure and the range of service (coverage). For example, a Global Navigation Satellite System (GNSS) is a system for determining the location of a user using signals from satellites in orbit around the Earth. The GNSS provides high location accuracy and availability in which errors of 10 m or less occur on a plane or a suburban area in which direct lines of sight between a satellite unit and a reception unit are acquired. However, in a congested metropolitan area, corresponding to a Non-Line-of-Sight (NLOS) area, there is a disadvantage in that location error rises to 50 m due to multi-path errors, and it is especially difficult to determine a location in indoor areas because reception sensitivity is deteriorated and, consequently, signals cannot be acquired. Among other wireless communication infrastructures, cellular-based location estimation technology refers to technology for determining the location of a user using the location information and measurement signals of a mobile communication base station. In detail, cellular-based location estimation technology is classified into Cell-ID, Enhanced-Observed Time Difference (E-OTD), and Advanced-Forward Link Trilateration (AFLT) depending on the number of base stations from which a terminal is capable of receiving signals. Due to the characteristics of mobile communication infrastructure, having most urban and suburban areas as a service range, cellular-based location estimation technology may determine locations in indoor areas as well as in outdoor areas. However, it is difficult to apply such cellular-based location estimation technology to indoor/outdoor navigation services which require a location accuracy having an error of about several meters because the precision of location estimation varies according to the density of deployment of base stations, and a relatively low location accuracy having an average error of about 100 to 800 m is realized.

PRIOR ART DOCUMENTS

Patent Documents (Patent Document 1) Korean Patent No: 10-1301020, Date of Registration: Aug. 22, 2013, Title: Movable Node Position Searching Device and Position Searching Method thereof (Patent Document 2) Korean Patent No: 10-1780592, Date of Registration: Sep. 14, 2017, Title: Location Estimation Method and Device

SUMMARY OF THE INVENTION

Accordingly, the present invention has been made keeping in mind the above problems occurring in the prior art, and an object of the present invention is to provide an apparatus and method for estimating an indoor location based on packet capture, which allow a location estimation server to estimate the location of a user terminal using Wi-Fi signal information acquired from the user terminal, thus accurately estimating the movement direction of the user terminal using only the received signal strength of a Wi-Fi packet.

The objects of the present invention are not limited to the above-described object, and other objects not described here may be clearly understood by those skilled in the art from the following description.

In accordance with an aspect of the present invention to accomplish the above object, there is provided a method for operating an apparatus for estimating an indoor location based on packet capture, including receiving packet capture information from multiple packet-collection-dedicated access points; searching a positioning infrastructure database for positioning data corresponding to the received packet capture information; and estimating a movement direction of a terminal using found positioning data.

Each of the multiple packet-collection-dedicated access points may receive a packet transmitted from the terminal.

Each of the multiple packet-collection-dedicated access points may collect the packet capture information having a unique number of the terminal and signal strength information of the transmitted packet using a packet-sniffing technique.

The positioning infrastructure database may be constructed by receiving the packet of the terminal, transmitted from a reference point in a service area, from the packet-collection-dedicated access points and by storing a signal strength corresponding to the received packet.

Searching the positioning infrastructure database for the positioning data may include searching for a reference point corresponding to the packet capture information by performing pattern matching on the positioning infrastructure database.

A found reference point may be estimated to be a location of the terminal.

The reference point may be found using a method corresponding to any one of nearest neighbor search, k-nearest neighbor search, and Jaccard Similarity comparison.

The method may further include estimating a movement direction of the terminal using a rate of change in a received signal strength of the packet capture information within a preset period of time.

Estimating the movement direction may include calculating, for each reference point, rates of change in strengths of signals received from the multiple packet-collection-dedicated access points; vectorizing received signal strengths corresponding to the calculated rates of change; and comparing a vector of the received signal strengths with vectors constructed in respective directions of the reference point, thus determining a direction angle of the terminal.

The rate of change in the received signal strength may be used for linear regression.

In accordance with another aspect of the present invention to accomplish the above object, there is provided a apparatus for estimating an indoor location based on packet capture, including multiple packet-collection-dedicated access points for acquiring packet capture information from a terminal; a positioning infrastructure database for storing pieces of positioning data about reference points corresponding to strengths of signals received from the multiple packet-collection-dedicated access points; and a location estimation server for receiving the packet capture information from the multiple packet-collection-dedicated access points, searching the positioning infrastructure database for a location of a reference point corresponding to the received packet capture information, and estimating a found reference point to be a location of the terminal.

The terminal may transmit a Wi-Fi or Bluetooth Low Energy (BLE) packet to the multiple packet-collection-dedicated access points.

The packet capture information may include a unique number of the terminal and strength information of a signal transmitted from the terminal.

The location estimation server may calculate rates of change in signals corresponding to a reference point from the packet capture information transmitted from the multiple packet-collection-dedicated access points, vectorizes the calculated rates of change in the signals, compares a vector of the rates of change in the signals with vectors constructed in the positioning infrastructure database, and then estimates a movement direction of the terminal based on a result of the comparison.

The location estimation server may allow the terminal to calculate a rate of change in signal strengths appearing within a preset period of time at a specific time point and to vectorize the calculated rate of change in the signal strengths, compare a vector of the rate of change in signal strengths with vectors constructed in the positioning infrastructure database, and estimate a movement direction of the terminal based on a result of the comparison.

In accordance with a further aspect of the present invention to accomplish the above object, there is provided a location estimation server of an apparatus for estimating an indoor location based on packet capture, including at least one processor; and a memory for storing at least one instruction that is executed by the at least one processor, wherein the at least one instruction is executed by the at least one processor so as to collect packet capture information from multiple packet-collection-dedicated access points, perform pattern matching on a positioning infrastructure database, and estimate a reference point corresponding to the packet capture information based on a result of pattern matching to be a location of the terminal.

The at least one instruction may be executed by the at least one processor so as to calculate, for possible movement directions from each reference point, rates of change in signal strengths acquired by the multiple packet-collection-dedicated access points and vectorize the calculated rates of change in the signal strengths.

The at least one instruction may be executed by the at least one processor so as to allow the terminal to calculate a rate of change in signal strengths appearing within a preset period of time at a specific time point and vectorize the calculated rate of change in the signal strengths.

The at least one instruction may be executed by the at least one processor so as to compare a vector of the rate of change in the signal strengths with vectors of rates of change constructed in the positioning infrastructure database, and determine a movement direction of the terminal based on a result of the comparison.

The at least one instruction may be executed by the at least one processor so as to predict a current location of the terminal based on past movement status of the terminal using a Kalman filter or particle filter and correct the current location of the terminal in consideration of the packet capture information.

BRIEF DESCRIPTION OF THE DRAWINGS

The accompanying drawings are provided to aid in understanding of the present embodiments, and the embodiments are provided together with the detailed descriptions thereof. However, the technical features of the present embodiments are not limited to what is specifically shown in the drawings, and the features disclosed in respective drawings may be combined to configure new embodiments.

FIG. 3 is a diagram exemplarily illustrating a positioning infrastructure database according to an embodiment of the present invention;

DESCRIPTION OF THE PREFERRED EMBODIMENTS

Figure 1:
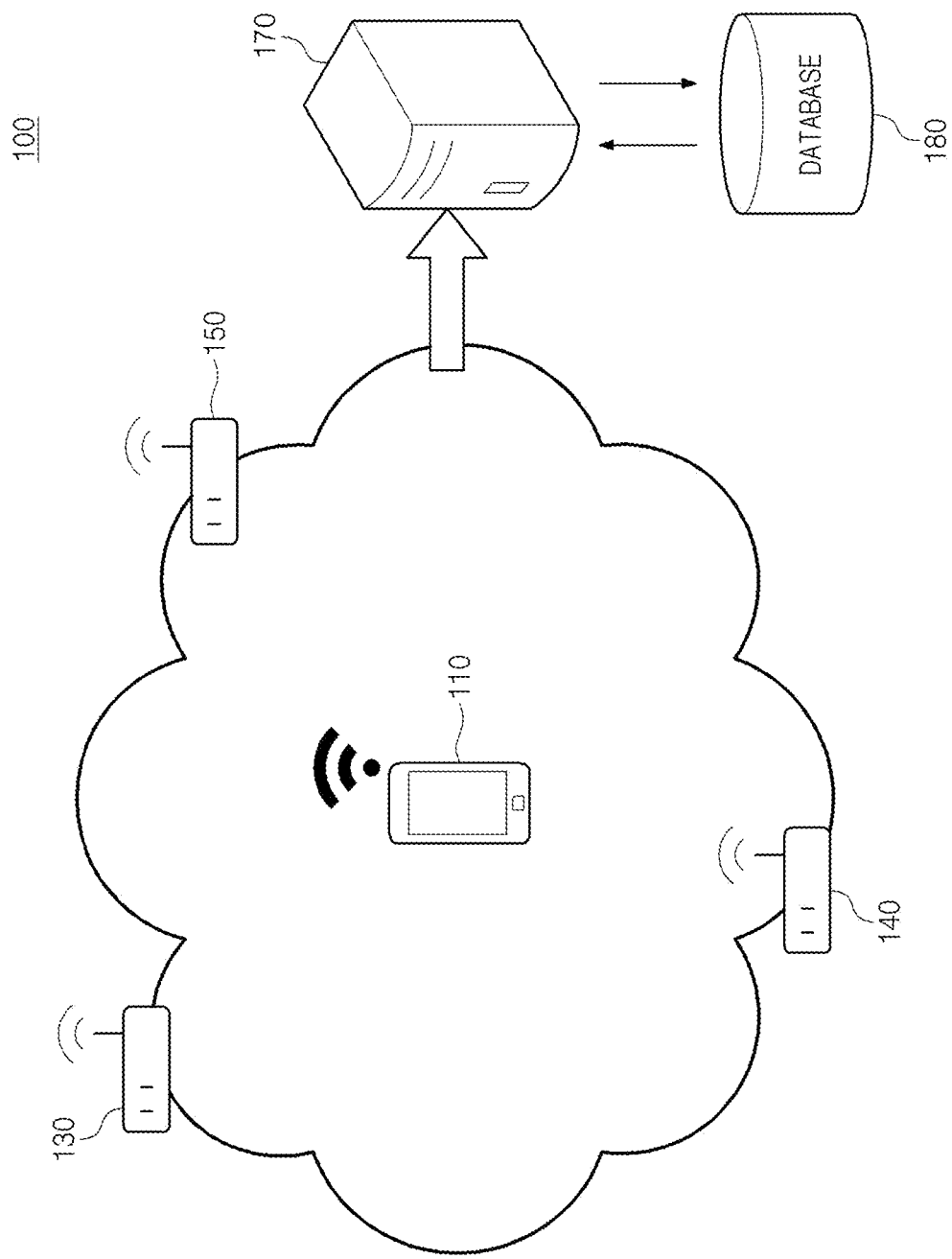
FIG. 1 is a diagram exemplarily illustrating an apparatus for estimating an indoor location based on packet capture according to an embodiment of the present invention.

Embodiments of the present invention are described with reference to the accompanying drawings in order to describe the present invention in detail so that those having ordinary knowledge in the technical field to which the present invention pertains can easily practice the present invention.

Reference will now be made in detail to various embodiments of the present invention, specific examples of which are illustrated in the accompanying drawings and described below, since the embodiments of the present invention can be variously modified in many different forms. However, this is not intended to limit the present invention to particular modes of practice, and it is to be appreciated that all changes, equivalents, and substitutes that do not depart from the spirit and technical scope of the present invention are encompassed in the present invention. It will be understood that, although the terms "first" and "second" may be used herein to describe various components, these components are not limited by these terms.

These terms are only used to distinguish one component from another component. For instance, a "first" component discussed below could be termed a "second" component without departing from the teachings of the present invention. Similarly, a "second" component could also be termed a "first" component. It will be understood that when a component is referred to as being "coupled" or "connected" to another component, it can be directly coupled or connected to the other component, or intervening components may be present therebetween. In contrast, it should be understood that when a component is referred to as being "directly coupled" or "directly connected" to another component, there are no intervening components present. The terminology used herein is for the purpose of describing particular embodiments only and is not intended to be limiting. In the present invention, singular forms are intended to include the plural forms as well, unless the context clearly indicates otherwise.

It should be further understood that the terms "comprise", "include", and "have", when used in this specification, specify the presence of stated features, integers, steps, operations, elements, components, and/or combinations thereof, but do not preclude the presence or addition of one or more other features, integers, steps, operations, elements, components, and/or combinations thereof. Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitely defined in the present specification.

An apparatus and method for estimating an indoor location based on packet capture according to an embodiment of the present invention are configured such that, after a packet-collection-dedicated Access Point (AP) has received a Wi-Fi packet transmitted from a user terminal, it transmits information required for location recognition to a location estimation server, and such that the location estimation server may accurately estimate the location of the user terminal.

Generally, in an indoor area, location estimation technology that chiefly uses Wi-Fi has been presented. For each Wi-Fi AP existing in a service area, Received Signal Strength Indicator (RSSI) values at respective reference points are collected, and a database (DB) is constructed using the collected RSSI values. Thereafter, when a terminal receives a signal in the corresponding service area, the pattern most similar to the RSSI value of the signal is searched for in the DB, and a reference point corresponding to the pattern is regarded as the current location of the terminal.

To date, the implementation of Wi-Fi-based indoor location recognition technology adopts a scheme in which a user terminal searches for a nearby Wi-Fi AP and directly compares the result of search with patterns in a DB stored in the user terminal, or a scheme in which the result of the search is transmitted to a location estimation server and then the location estimation server compares the result of the search with corresponding patterns. However, there is posed a problem of making it difficult to estimate the location of a user when a location recognition application is not installed on the user terminal, or when it is installed but is not executed on the user terminal. A smartphone supporting a specific Operating System (OS) does not provide a Software Development Kit (SDK) required to search for a Wi-Fi AP, thus making it difficult to perform Wi-Fi-based location recognition itself.

An apparatus and method for estimating an indoor location according to an embodiment of the present invention may accurately estimate the movement direction of a terminal using only the received signal strength of a Wi-Fi packet in technology in which a location estimation server estimates the location of a terminal using Wi-Fi signal information acquired from the terminal. Here, the estimated movement direction information may be used as auxiliary information in a filter used for a location estimation server-based location estimation algorithm.

FIG. 1 is a diagram exemplarily illustrating an apparatus for estimating an indoor location based on packet capture according to an embodiment of the present invention. Referring to FIG. 1, an apparatus 100 for estimating an indoor location based on packet capture (hereinafter also referred to as a packet-capture-based indoor location estimation apparatus 100") may include multiple packet-collection-dedicated Access Points (APs) 130, 140, and 150, a location estimation server 170, and a positioning infrastructure database (DB) 180 so as to recognize the location of a terminal 110.

In a typical terminal-based indoor location recognition apparatus, an application installed on the terminal scans a nearby Wi-Fi AP and a Received Signal Strength Indicator (RSSI), performs pattern matching on information previously collected in the positioning infrastructure DB 180, and then estimates the collection point having the pattern most similar to the scanned information to be the current location of the terminal.

In contrast, in the packet-capture-based indoor location estimation apparatus 100 according to the embodiment of the present invention, the packet-collection-dedicated APs 130, 140, and 150 may receive a packet, such as a Wi-Fi or Bluetooth Low Energy (BLE) packet, transmitted from the terminal 110 so as to perform communication, and transmit the received packet to the location estimation server 170, and the location estimation server 170 may estimate the collection point having the pattern most similar to the received packet to be the current location of the terminal 110 through pattern matching on the positioning infrastructure DB 180.

Each of packet-collection-dedicated APs 130, 140, and 150 may collect packets transmitted from the terminal 110 existing in the service area through a packet-sniffing technique. Here, information of each collected packet may include the unique number of the terminal 110 (generally, a Media Access Control (MAC) address of a Wi-Fi or BLE interface) and Received Signal Strength Indicator (RSSI) information of the packet transmitted from the terminal 110.

Since the packet transmitted from the terminal 110 is received by the multiple packet-collection-dedicated APs, the data finally recognized by the location estimation server 170 (i.e., captured data) may be represented by the following Equation (1):

$$\mathrm{CapturedData} = \{\mathrm{DeviceName}, (\mathrm{AP1}_{Name}, \mathrm{RSSI}_1), (\mathrm{AP2}_{Name}, \mathrm{RSSI}_2), \ldots, (\mathrm{APk}_{Name}, \mathrm{RSSI}_k)\} \qquad (1)$$

Here, DeviceName denotes the unique number of the terminal, and each of $(\mathrm{AP1}_{Name}, \mathrm{RSSI}_1)$, $(\mathrm{AP2}_{Name}, \mathrm{RSSI}_2)$, $(\mathrm{APk}_{Name}, \mathrm{RSSI}_k)$ may represent the corresponding Access Point (AP) and the received signal strength indicator (RSSI) information of the packet received by the corresponding AP from the terminal.

The packet-capture-based indoor location estimation apparatus 100 according to the embodiment of the present invention does not require the installation or execution of an application, unlike conventional terminal-based location recognition technology, and allows the location estimation server 170 to estimate the location of the terminal 110 when the terminal 110 performs only Wi-Fi communication, thus allowing the location information of the terminal 110 to be more variously and flexibly used.

The packet-capture-based indoor location estimation apparatus 100 according to the embodiment of the present invention may estimate the movement direction of a user, thus utilizing the movement direction as auxiliary information in a filter that is used in a location estimation server-based location estimation algorithm while greatly reducing the problem of occurrence of location estimation error attributable to variability in a Wi-Fi received signal strength indicator (RSSI). Meanwhile, the packet-capture-based indoor location estimation apparatus 100 may also be referred to as a "location estimation server-based indoor location estimation apparatus" because the location estimation server 170 is the entity that performs location estimation.

Meanwhile, in order for the location estimation server 170 to use the received signal information of the terminal 110 for indoor location estimation, a positioning infrastructure DB must be constructed in a service target area.

Figure 2:
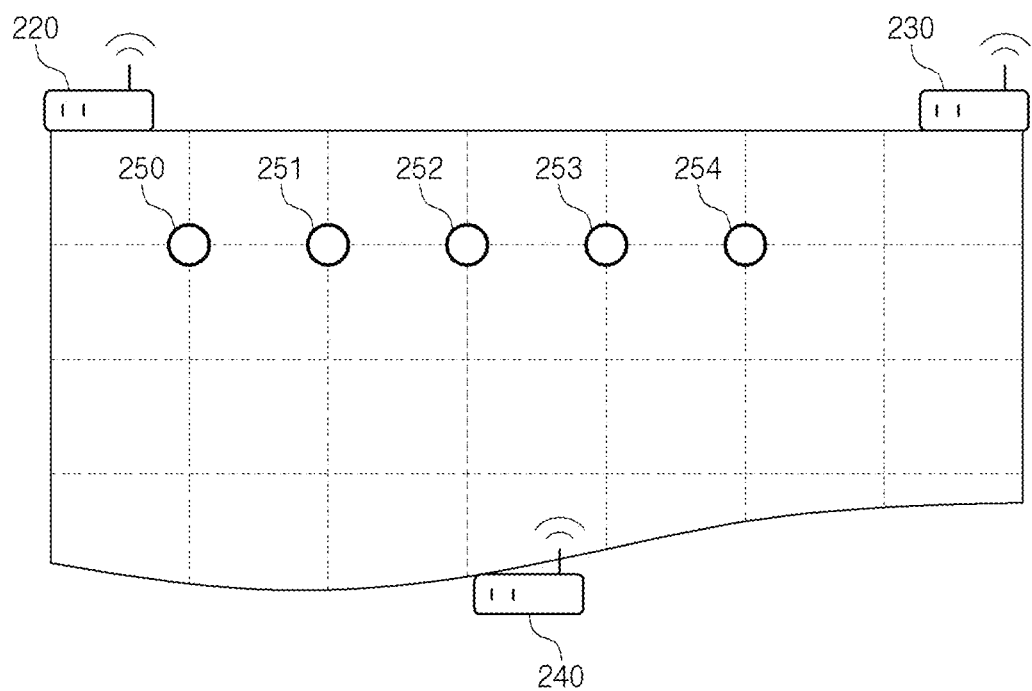
FIG. 2 is a diagram exemplarily illustrating a method for constructing a positioning infrastructure database according to an embodiment of the present invention.

FIG. 2 is a diagram exemplarily illustrating a method for constructing the positioning infrastructure DB 180 according to an embodiment of the present invention. Referring to FIG. 2, the method for constructing the positioning infrastructure DB 180 may be initiated by dividing the space of a service area at regular intervals and generating a reference point 250. When a collection terminal (e.g., 110 of FIG. 1) is deployed at each of reference points 250, 251, 252, 253, and 254 and generates a packet during a predetermined period of time, packet-collection-dedicated Access Points (APs) 220, 230, and 240 installed near the corresponding reference point may receive the packet, and may store RSSI at the corresponding reference point in the positioning infrastructure DB 180.

FIG. 3 is a diagram exemplarily illustrating the positioning infrastructure DB 180 according to an embodiment of the present invention. Referring to FIG. 3, pieces of data collected in the positioning infrastructure DB 180 may be converted into pieces of received signal strength indicator (RSSI) information for respective packet-collection-dedicated APs at each reference point, and then the positioning infrastructure DB 180 may be constructed.

As illustrated in FIG. 3, a situation is exemplarily illustrated in which, in a service area in which k packet-collection-dedicated APs are present, pieces of RSSI information are investigated at n reference points and are then stored in the positioning infrastructure DB 180. Depending on the reference points, a packet transmitted from the collection terminal may not reach the packet-collection-dedicated APs due to the long distances to the packet-collection-dedicated APs, and thus RSSI values may not be stored for respective reference points.

Below, a packet-capture-based indoor location estimation algorithm will be described. The algorithm for estimating an indoor location using the positioning infrastructure DB 180 may be implemented in various manners.

In an embodiment, the most basic method is intended to search for the reference point having the pattern most similar to a captured Wi-Fi signal of a location recognition terminal using a method such as a nearest neighbor search, a k-nearest neighbor search, or a Jaccard similarity comparison method. This method may estimate the location of the terminal using only a simple operation.

In another embodiment, the location may be corrected using a method based on a Kalman filter or a particle filter in order to reduce the deviation of the estimated location values. The current location of the terminal may be predicted based on the past movement status of the terminal, and may be corrected in consideration of pieces of measured information while the location of the terminal is increasingly accurately estimated with the update of the movement status.

Generally, an existing terminal-based location recognition algorithm uses a compass or a geomagnetic sensor in order to correct the movement direction of the terminal in a filter. In contrast, the packet-capture-based indoor location estimation algorithm using packet capture information makes it difficult to acquire information from a sensor. Therefore, the movement direction of the terminal may be estimated using the rate of change in received signal strength (or RSSI), and the estimated movement direction may be used.

Figure 4:
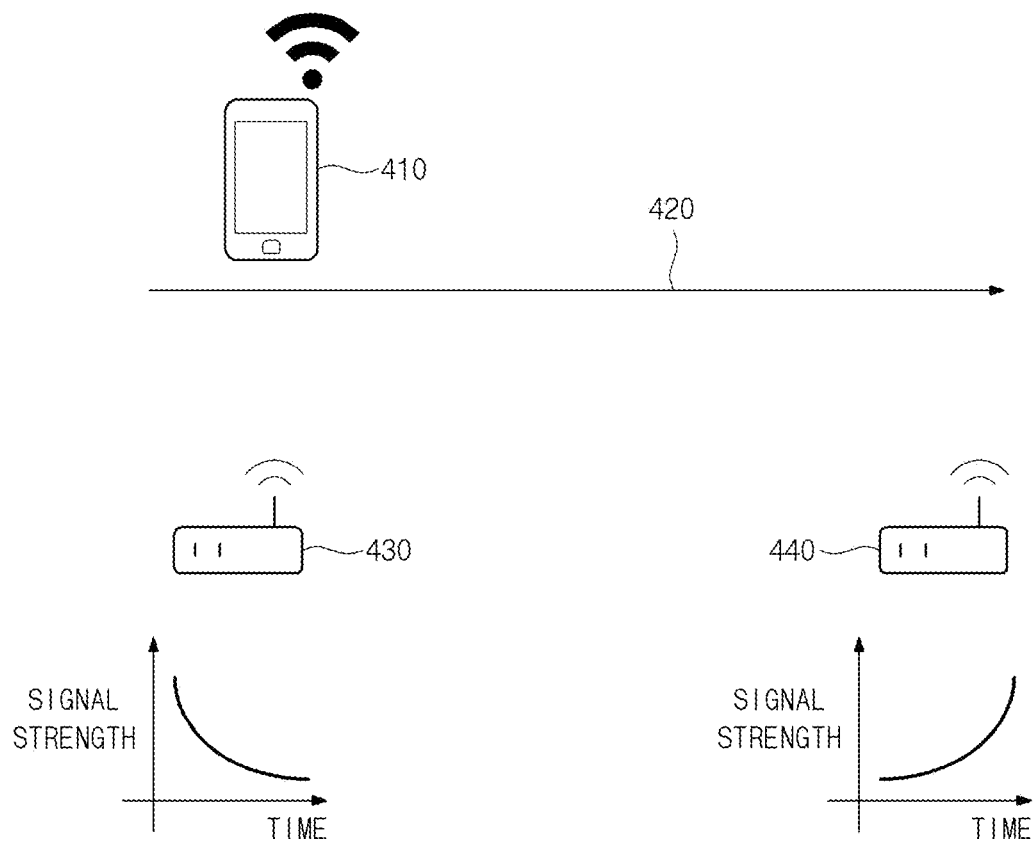
FIG. 4 is a diagram conceptually illustrating the principle of estimating the movement direction of a terminal using the rate of change in received signal strength in an apparatus for estimating an indoor location based on packet capture according to an embodiment of the present invention.

FIG. 4 is a diagram conceptually illustrating the principle of estimating the movement direction of a terminal using the rate of change in received signal strength in an apparatus for estimating an indoor location based on packet capture according to an embodiment of the present invention. Referring to FIG. 4, the principle of a method for estimating the movement direction of a terminal 410 using only the strength of a signal obtained by a packet-collection-dedicated AP receiving a packet transmitted from the terminal 410 will be described below.

The terminal 410 moves (indicated by 420) while transmitting a packet. Packet-collection-dedicated APs 430 and 440 that have received the packet have different signal strengths (RSSI) depending on the location of the terminal 410. That is, as the terminal 410 approaches a certain packet-collection-dedicated AP, the packet-collection-dedicated AP receives a stronger signal, whereas as the terminal 410 moves farther away from the certain packet-collection-dedicated AP, the packet-collection-dedicated AP receives a weaker signal.

As illustrated in FIG. 4, in the case of a two-dimensional (2D) linear space, when moving from each reference point to the left or right, the extent to which the strength of a signal received by the packet-collection-dedicated AP increases or decreases may be vectorized.

As illustrated in FIG. 4, when the terminal 410 moves to the right, the strength of a signal received by the packet-collection-dedicated AP 430 continues to decrease, whereas the strength of a signal received by the packet-collection-dedicated AP 440 continues to increase. By expanding this principle, when three or more packet-collection-dedicated APs are present in a service area and all signal strengths for respective reference points are constructed, how signal strengths for all reachable reference points from each reference point change may be vectorized, and the movement direction of the terminal 410 may be estimated using only the strengths of received signals (RSSI).

Figure 5:
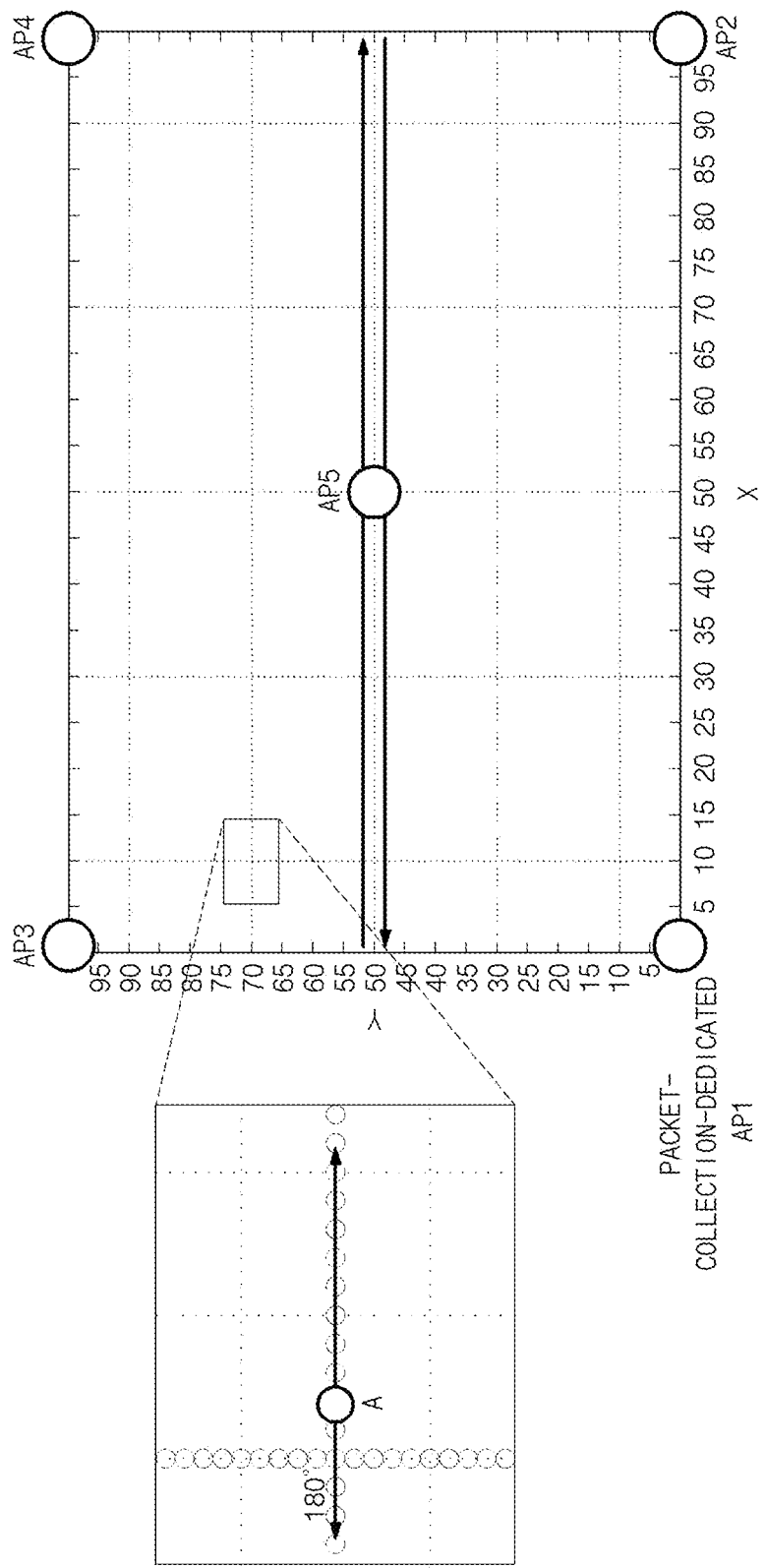
FIG. 5 is a diagram exemplarily illustrating a simulation scenario in which a service target area is assumed and then five packet-collection-dedicated APs are deployed, after which a terminal is moved.

FIG. 5 illustrates a simulation scenario in which a service target area of 100 m×100 m is assumed and five packet-collection-dedicated APs are deployed, and in which a terminal departs from a point (0,50), moves to a point (100,50), and thereafter returns back to the point (0,50).

Before the location of the terminal is recognized, all reachable reference points within a certain range from each reference point, such as point A, may be investigated, and the direction angle for each reference point may be calculated. At point A, the terminal may reach points existing in directions of 0° and 180°. Thereafter, after N reference points existing in the direction of 0° from point A have been loaded, the rates of change in signals acquired by packet-collection-dedicated AP1 to AP5 may be calculated.

For example, when the terminal moves in a direction of 0° with respect to point A, the strengths of signals acquired by AP1 and AP3 are slightly decreased, the strengths of signals acquired by AP2 and AP4 are slightly increased, and the strength of a signal acquired by AP5 may be increased to a relatively large extent. These results may be vectorized as (AP1, AP2, AP3, AP4, AP5)=(−1.5, +1.2, −1.7, +1.9, +4.2). Here, the respective numbers may mean that, when the terminal moves from point A to the point existing in the direction of 0°, the strength of a signal received by each packet-collection-dedicated AP increases or decreases at a rate as high as about the corresponding number. Meanwhile, the rate of change in each signal may be obtained using a method, such as linear regression.

Figure 6:
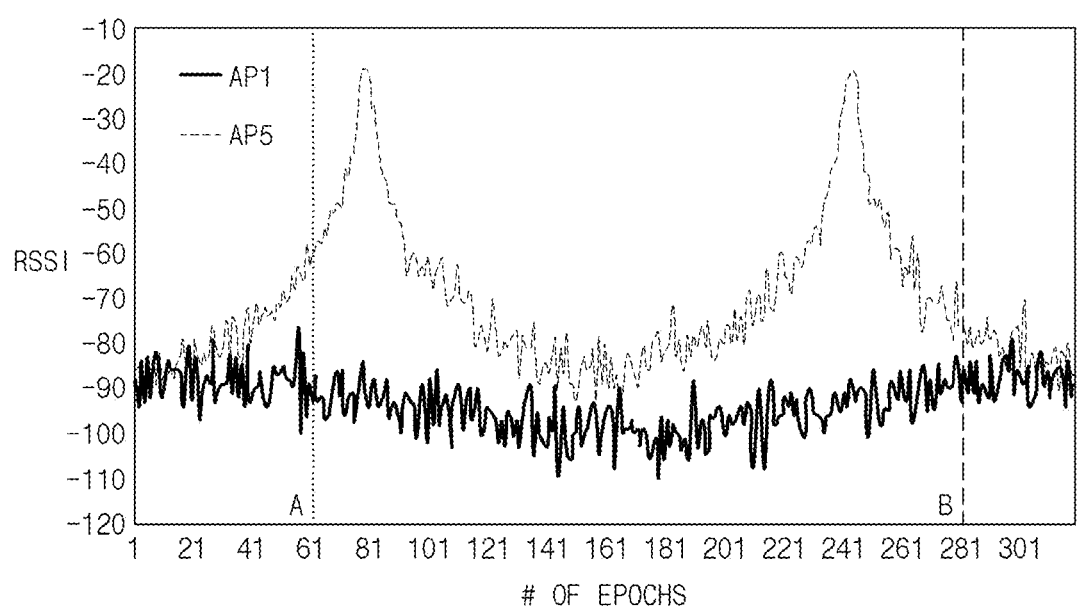
FIG. 6 is a diagram exemplarily illustrating changes in packet-received signals occurring in AP1 and AP5 in the simulation scenario of FIG. 5.

FIG. 6 is a diagram exemplarily illustrating changes in packet-received signals received by AP1 and AP5 in the simulation scenario illustrated in FIG. 5. Referring to FIG. 16, in the scenario in which the terminal is moving, changes in the strengths of signals received by the packet-collection-dedicated AP1 and AP5 are illustrated. That is, as the terminal approaches the corresponding AP, the signal strength is increased, whereas as the terminal moves farther away from the corresponding AP, the signal strength is decreased.

When the rates of change in the signal strengths (or RSSI) appearing within a predetermined period of time at time point A are represented by numerical values, (AP1, AP5)=(−0.2, +1.1) may be given. When the rates of change in the signals strengths at time point B are represented by numerical values, (−0.9, +0.3) may be given. The rates of change in signal strengths, represented by the vector, may be compared with vectors previously constructed in the directions of respective reference points, and the direction angle most similar to the vector may be determined, and thus the movement direction of the terminal may be estimated depending on the direction angle.

Figure 7A:
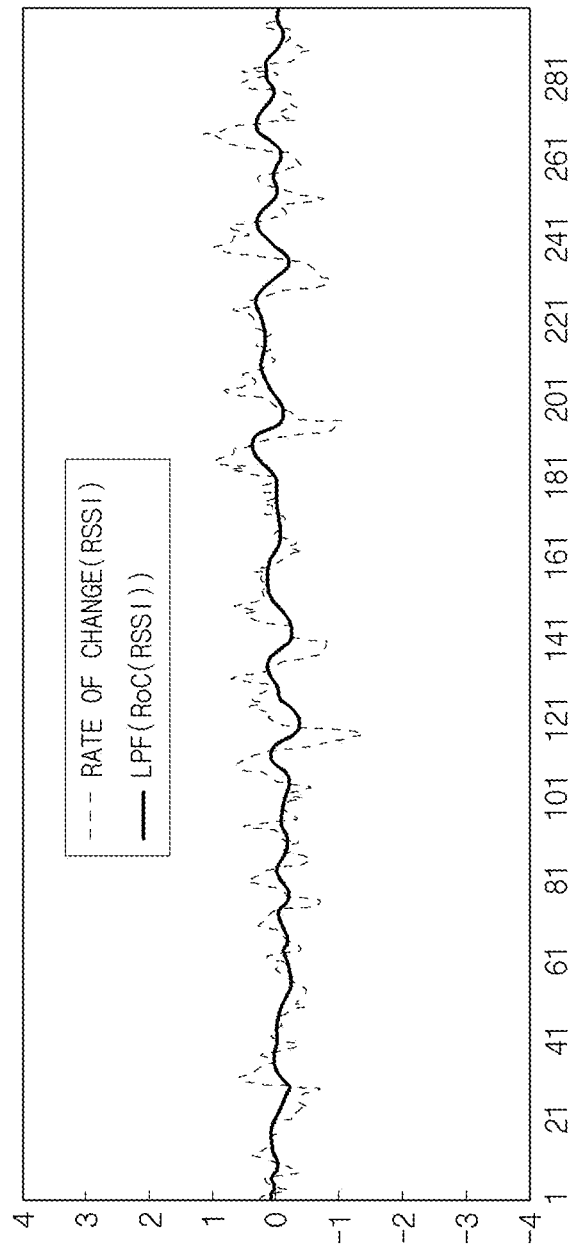
FIGS. 7A and 7B are diagrams exemplarily illustrating the range of change in a packet-received signal according to an embodiment of the present invention.
Figure 7B:
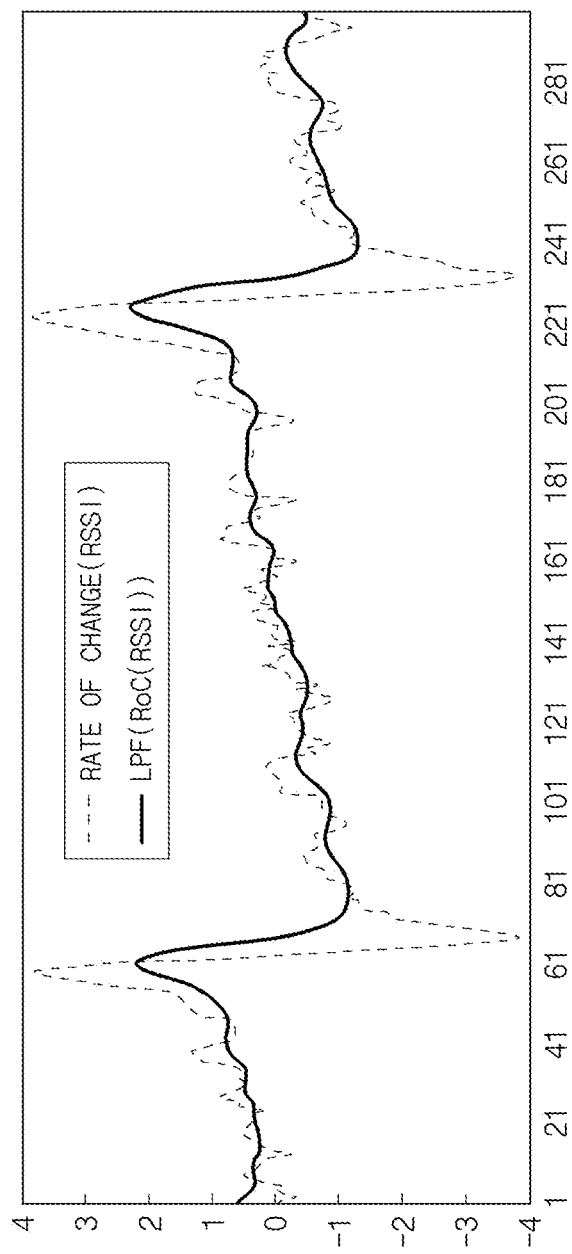

FIGS. 7A and 7B are diagrams exemplarily illustrating the rate of change in packet received signals according to an embodiment of the present invention. FIG. 7A illustrates the rate of change in a packet received signal (RSSI) by AP1 and FIG. 7B illustrates the rate of change in a packet received signal (RSSI) by AP5.

Figure 8:
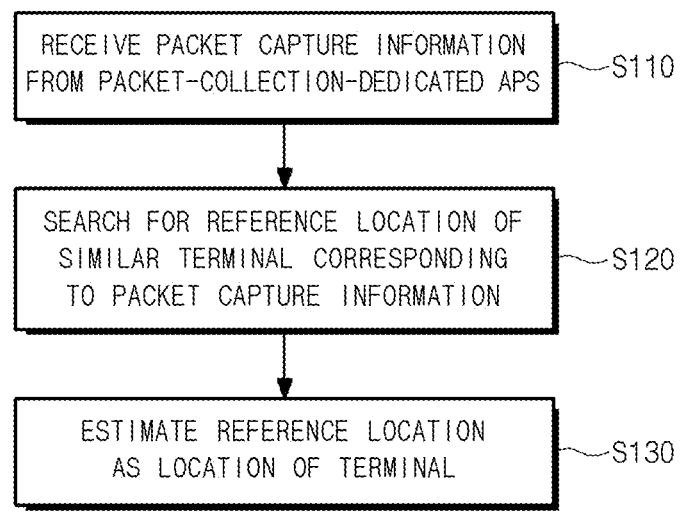
FIG. 8 is a flowchart exemplarily illustrating a method for operating an apparatus for estimating an indoor location based on packet capture according to an embodiment of the present invention.

FIG. 8 is a flowchart exemplarily illustrating a method for operating a packet-capture-based indoor location estimation apparatus according to an embodiment of the present invention. Referring to FIGS. 1 to 8, the method for operating the packet-capture-based indoor location estimation apparatus 100 is described below.

The location estimation server 170 may receive packet capture information for a mobile terminal from packet-collection-dedicated APs through wired/wireless communication at step S110. The location estimation server 170 may determine whether there is a reference point of a terminal having a pattern similar to the packet capture information by searching the positioning infrastructure DB 180 corresponding to the received packet capture information at step S120. When the reference point of the terminal having the similar pattern is present in the positioning infrastructure DB 180, the location estimation server 170 may estimate the location of the reference point to be the location of the terminal at step S130.

In an embodiment, in order to determine the movement direction of the terminal, information about a packet transmitted from the smartphone terminal of the user for wireless communication may be used.

In an embodiment, information about the packet transmitted from the terminal may be acquired by a packet-collection-dedicated AP installed near the terminal, and the acquired packet information may be used to estimate the direction of the terminal.

In an embodiment, in the packet acquired by the packet-collection-dedicated AP, only the unique ID of the terminal and received signal strength indicator (RSSI) information may be used to estimate the direction of the terminal.

In an embodiment, in order to determine the movement direction of the terminal, the rate of change in the signal acquired by each packet-collection-dedicated AP for a possible movement direction from each reference point may be calculated, and the calculated rate of change in the signal may be vectorized.

In an embodiment, in order to determine the movement direction of the terminal, the terminal calculates the rate of change in signal strengths appearing within a predetermined period of time at a specific time point, and may vectorize the calculated rate of change in the signal strengths.

In an embodiment, the change rate vector calculated by the terminal may be compared with previously constructed change rate vectors, and the direction angle of a pattern most similar to the calculated change rate vector may be determined to be the movement direction of the terminal.

The packet-capture-based indoor location estimation technology according to the embodiment of the present invention does not require the installation or execution of an application, unlike conventional terminal-based location recognition technology that was widely used in the past, and the location estimation server may estimate the location of the terminal when the terminal performs only Wi-Fi communication. Thus, the location information of the terminal may be more variously and flexibly used.

In the packet-capture-based indoor location estimation technology according to the embodiment of the present invention, in order for the location estimation server to more accurately estimate the location of the terminal, the location estimation server may estimate the location of the terminal using the Wi-Fi signal information acquired from the terminal. Such server-based location estimation technology may accurately estimate the movement direction of the terminal using only the received signal strength of a Wi-Fi packet.

Generally, terminal-based location recognition technology may acquire the movement direction of a user from a geomagnetic sensor. In contrast, the packet-capture-based indoor location estimation technology may estimate the movement direction of the user, thus enabling the movement direction to be used as auxiliary information in a filter that is used in a location estimation server-based location estimation algorithm while greatly reducing the problem of occurrence of location estimation error attributable to variability in a Wi-Fi-received signal strength indicator (RSSI).

Figure 9:
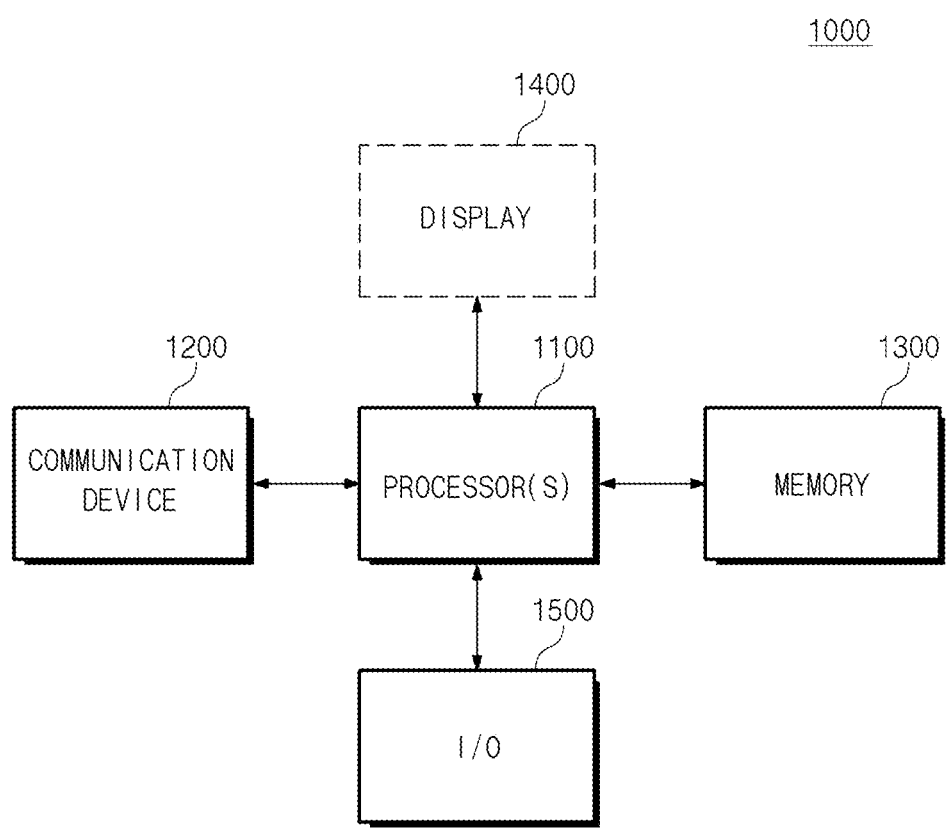
FIG. 9 is a diagram exemplarily illustrating a location estimation server in the apparatus for estimating an indoor location based on packet capture according to an embodiment of the present invention.

FIG. 9 is a diagram exemplarily illustrating the location estimation server 1000 of the apparatus for estimating an indoor location based on packet capture according to an embodiment of the present invention. Referring to FIG. 9, the location estimation server 1000 of the packet-capture-based indoor location estimation apparatus may include at least one processor 1100, a network interface 1200, memory 1300, a display 1400, and an input/output device 1500.

The processor 1100 may include at least one device implemented through FIGS. 1 to 8, or may be implemented using at least one method described above with reference to FIGS. 1 to 8. As described above, the processor 1100 may execute instructions so as to receive packet capture information from multiple packet-collection-dedicated access points, search for a point corresponding to the packet capture information received from a positioning infrastructure DB, and estimate the location of the terminal using the found point. Also, the processor 1100 may execute the instructions so as to estimate the movement direction of the terminal using the rate of change in a signal corresponding to the collected packet capture information or in the signal strength thereof.

The processor 1100 may execute a program and control the location estimation server 1000. The location estimation server 1000 of the packet-capture-based indoor location estimation apparatus may be connected to an external device (e.g., a personal computer or a network) through the input/output device 1500, and may exchange data with the external device. The location estimation server 1000 may include various electronic devices, for example, a mobile device such as a mobile phone, a smart phone, a Personal Digital Assistance (PDA), a tablet computer, or a laptop computer, a computing device such as a personal computer, a tablet computer, or a Netbook, or an electronic appliance such as a television (TV), a smart television, or a security device for gate control.

The network interface 1200 may be implemented to perform communication with an external network in various wired/wireless manners.

The memory 1300 may include computer-readable instructions. The processor 1100 may perform the above-described operations when the instructions stored in the memory 1300 are executed on the processor 1100. The memory 1300 may be volatile memory or nonvolatile memory. The memory 1300 may include a storage device to store data of a user. The storage device may be an Embedded Multimedia Card (eMMC), a Solid-State Drive (SSD), universal flash storage (UFS), or the like. The storage device may include at least one nonvolatile memory device. The nonvolatile memory device may be any one of NAND flash memory, Vertical NAND (VNAND) flash memory, NOR flash memory, Resistive Random Access Memory (RRAM), Phase-Change Memory (PRAM), Magnetoresistive Random Access Memory (MRAM), Ferroelectric Random Access Memory (FRAM), and Spin Transfer Torque Random Access Memory (STT-RAM).

The above-described embodiments may be implemented using hardware components, software components, and/or combinations of hardware components and software components. For example, the apparatus (device), method, and components described above in the embodiments may be implemented using one or more general-purpose computers or special-purpose computers, as in the case of a processor, a controller, an Arithmetic Logic Unit (ALU), a digital signal processor, a microcomputer, a Field-Programmable Gate Array (FPGA), a Programmable Logic Unit (PLU), a microprocessor, or any other device capable of executing and responding to instructions. A processing device may execute an Operating System (OS) and one or more software applications running on the OS.

Further, the processing device may access, store, handle, process and generate data in response to the execution of software. For convenience of understanding, there is the case where a single processing device is described as being used, but those skilled in the art to which the corresponding technical fields pertain will understand that the processing device may include multiple processing elements and/or multiple types of processing elements. For example, the processing device may include multiple processors or a single processor and a single controller. Furthermore, the processing device may include an additional processing configuration such as one including parallel processors.

The software may include a computer program, code, an instruction, or a combination of one or more thereof, and may configure the processing device so that the processing device is operated in a desired manner, or may independently or collectively issue commands to the processing device. The software and/or data may be interpreted by the processing device or may be permanently or temporarily embodied in a certain type of machine, a component, a physical device, virtual equipment, a computer-storage medium or device, or a signal wave to be transmitted so as to provide commands or data to the processing device. The software may be distributed to computer systems connected over a network, and may also be stored or executed in a distributed manner. The software and data may be stored in one or more computer-readable storage media.

The location estimation server 1000 of the packet-capture-based indoor location estimation apparatus according to an embodiment of the present invention may include the at least one processor 1100 and the memory 1300 for storing at least one instruction executed by the at least one processor 1100. The at least one instruction may be executed so as to collect packet capture information from multiple packet-collection-dedicated access points (APs), perform pattern matching on the positioning infrastructure DB, and estimate the reference point corresponding to the packet capture information to be the location of the terminal as a result of pattern matching.

The method according to the embodiment may be implemented in program instructions that can be executed through various types of computer means, and may be recorded in a computer-readable storage medium. The computer-readable storage medium may include a program instruction, a data file, a data structure, etc. alone or in combination. The program instruction recorded in the medium may be designed and configured especially for embodiments or may be known to and used by those skilled in computer software fields. Examples of the computer-readable storage medium may include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

The packet-capture-based indoor location estimation apparatus and method according to embodiments of the present invention do not require the installation or execution of an application, unlike conventional terminal-based location recognition technology, and the location estimation server estimates the location of the terminal when the terminal performs only Wi-Fi communication. Thus, the location information of the terminal may be more variously and flexibly used.

The packet-capture-based indoor location estimation apparatus and method according to embodiments of the present invention may estimate the movement direction of a user, thus utilizing the movement direction as auxiliary information in a filter that is used in a location estimation server-based location estimation algorithm while greatly reducing the problem of occurrence of location estimation error attributable to variability in a Wi-Fi received signal strength indicator (RSSI).

Meanwhile, the descriptions of the present invention merely provide detailed embodiments for practicing the invention. The present invention may include not only means that are detailed and actually usable, but also the technical spirit, which is an abstract and conceptual idea that may be available as technology in the future.

What is claimed is:

1. A method for operating an apparatus for estimating an indoor location based on packet capture, the method comprising:
receiving packet capture information from multiple packet-collection-dedicated access points in a service area;
searching a positioning infrastructure database for positioning data of a reference point corresponding to the received packet capture information, the positioning infrastructure database including positioning data of a plurality of reference point obtained by dividing the service area;
estimating the reference point corresponding to the received packet capture information to be a location of a target terminal; and
estimating a movement direction of the target terminal based on the reference point,
wherein estimating the movement direction comprises:
calculating rates of change in strengths of signals of the packet capture information received from the multiple packet-collection-dedicated access points; and
vectorizing received signal strengths corresponding to the calculated rates of change; and
comparing a vector of the received signal strengths with vectors constructed in respective directions of the reference point, thus determining a direction angle of the target terminal.

2. The method of claim 1, wherein each of the multiple packet-collection-dedicated access points receives a packet transmitted from the target terminal.

3. The method of claim 1, wherein each of the multiple packet-collection-dedicated access points collects the packet capture information having a unique number of the target terminal and signal strength information of the transmitted packet using a packet-sniffing technique.

4. The method of claim 1, wherein the positioning infrastructure database is constructed by receiving packet capture information from the multiple packet-collection-dedicated access points each receiving a packet of a collection terminal deployed at each of the plurality of reference points, and storing, as positioning data corresponding to each of the plurality of reference points, a signal strength corresponding to the packet received by each of the multiple packet-collection-dedicated access points from the collection terminal.

5. The method of claim 1, wherein searching the positioning infrastructure database for the positioning data comprises searching for a reference point corresponding to the packet capture information by performing pattern matching on the positioning infrastructure database and the received packet capture information.

6. The method of claim 5, wherein a found the reference point is estimated to be a location of the target terminal.

7. The method of claim 5, wherein the reference point is found using a method corresponding to any one of nearest neighbor search, k-nearest neighbor search, and Jaccard Similarity comparison.

8. The method of claim 1, wherein the rates of change in strengths of signals are determined within a preset period of time.

9. The method of claim 1, wherein the rates of change in strengths of signals are used for linear regression.

10. An apparatus for estimating an indoor location based on packet capture, the apparatus comprising:
multiple packet-collection-dedicated access points disposed in a service area and configured to receive a packet from a target terminal and output information of the received packet as packet capture information;
a positioning infrastructure database for storing positioning data of a plurality of reference points obtained by dividing the service area, the positioning data corresponding to strengths of signals received by the multiple packet-collection-dedicated access points from a collection terminal deployed at each of the plurality of reference points; and
a location estimation server configured to receive the packet capture information from the multiple packet-collection-dedicated access points, searching the positioning infrastructure database for a reference point corresponding to the received packet capture information, and estimating the reference point to be a location of the target terminal,
wherein the location estimation server is further configured to calculate rates of change in signals corresponding to the reference point from the packet capture information transmitted from the multiple packet-collection-dedicated access points, vectorize the calculated rates of change in the signals, compare a vector of the rates of change in the signals with vectors constructed in the positioning infrastructure database, and estimate a movement direction of the target terminal based on a result of the comparison.

11. The apparatus of claim 10, wherein the target terminal transmits a Wi-Fi or Bluetooth Low Energy (BLE) packet to the multiple packet-collection-dedicated access points.

12. The apparatus of claim 10, wherein the packet capture information includes a unique number of the target terminal and strength information of a signal transmitted from the target terminal.

13. The apparatus of claim 10, wherein the location estimation server calculates a rate of change in signal strengths appearing within a preset period of time at a specific time point and vectorizes the calculated rate of change in the signal strengths to estimate the movement direction of the target terminal.

14. A location estimation server of an apparatus for estimating an indoor location based on packet capture, the server comprising:
at least one processor; and
a memory for storing at least one instruction that is executed by the at least one processor,
wherein the at least one instruction is executed by the at least one processor so as to:
collect packet capture information from multiple packet-collection-dedicated access points in a service area, perform pattern matching on the packet capture information and positioning data in a positioning infrastructure database to find a reference point corresponding to the packet capture information, the positioning data corresponding to a plurality of reference points obtained by dividing the service area, and estimate the reference point corresponding to the packet capture information to be a location of a target terminal, wherein the at least one instruction is executed by the at least one processor so as to calculate, for possible movement directions from the reference point, rates of change in signals acquired by the multiple packet-collection-dedicated access points and vectorize the calculated rates of change in signals.

15. The location estimation server of claim 14, wherein the at least one instruction is executed by the at least one processor so as to calculate a rate of change in signal strengths appearing within a preset period of time at a specific time point and vectorize the calculated rate of change in the signal strengths.

16. The location estimation server of claim 15, wherein the at least one instruction is executed by the at least one processor so as to compare a vector of the rate of change in the signal strengths with vectors of rates of change constructed in the positioning infrastructure database, and determine a movement direction of the target terminal based on a result of the comparison.

17. The location estimation server of claim 14, wherein the at least one instruction is executed by the at least one processor so as to predict a current location of the target terminal based on past movement status of the target terminal using a Kalman filter or particle filter and correct the current location of the target terminal in consideration of the packet capture information.

* * * * *